(12) United States Patent
Azagury et al.

(10) Patent No.: US 8,595,792 B2
(45) Date of Patent: Nov. 26, 2013

(54) METHOD TO AUTOMATICALLY MAP BUSINESS FUNCTION LEVEL POLICIES TO IT MANAGEMENT POLICIES

(75) Inventors: Alain C. Azagury, Haifa (IL); Murthy V. Devarakonda, Peekskill, NY (US); Nikolai A. Joukov, Thornwood, NY (US); Manoj Kumar, Yorktown Heights, NY (US); Birgit M. Pfitzmann, Valhalla, NY (US); Norbert G. Vogl, Mahopac, NY (US); Konstantinos Magoutis, Heraklion (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/553,332

(22) Filed: Jul. 19, 2012

(65) Prior Publication Data

US 2012/0284243 A1 Nov. 8, 2012

Related U.S. Application Data

(63) Continuation of application No. 12/134,933, filed on Jun. 6, 2008, now Pat. No. 8,255,972.

(51) Int. Cl.
G06F 17/30 (2006.01)

(52) U.S. Cl.
USPC .................................................. 726/2

(58) Field of Classification Search
None
See application file for complete search history.

(56) References Cited

U.S. PATENT DOCUMENTS

| 6,167,445 | A  | * | 12/2000 | Gai et al. ............... 709/223 |
| 6,973,488 | B1 |   | 12/2005 | Yavatkar et al. |
| 7,170,993 | B2 |   | 1/2007  | Anderson et al. |
| 7,191,229 | B2 |   | 3/2007  | Edmondson |
| 7,337,105 | B2 |   | 2/2008  | Sugimoto |
| 7,698,545 | B1 |   | 4/2010  | Campbell et al. |
| 7,711,000 | B2 |   | 5/2010  | Hu et al. |
| 7,735,140 | B2 |   | 6/2010  | Datla et al. |
| 7,886,035 | B2 |   | 2/2011  | Stark |
| 7,904,909 | B1 | * | 3/2011  | Reiner et al. ............ 718/104 |
| 8,010,952 | B2 |   | 8/2011  | Datla et al. |
| 8,190,723 | B2 |   | 5/2012  | Datla et al. |
| 8,196,126 | B2 | * | 6/2012  | Ziegler .................. 717/153 |

(Continued)

OTHER PUBLICATIONS

Beigi (Beigi et al., "Policy Transformation Techniques in Policy-based Systems Management", Proceedings of the Fifth IEE International Workshop of Policies for Distributed Systems and Networks (POLICY 04').*

(Continued)

*Primary Examiner* — Peter Poltorak
(74) *Attorney, Agent, or Firm* — Scully, Scott, Murphy & Presser, P.C.; Daniel P. Morris, Esq.

(57) ABSTRACT

A method, system, computer program product, and computer program storage device for transforming a high-level policy associated with a high layer to a low-level policy associated with a low layer. Mapping between high-level objects in a high layer and low-level objects in a low layer is derived by an automated discovery tool. The high-level policy is mapped to the low-level policy according to the mapping (e.g., by substituting the high-level objects with the low-level objects and by performing a syntax transformation). In one embodiment, a low-level policy is transformed to a high-level policy according to the mapping. As exemplary embodiments, policy transformations in traffic shaping and data retention are disclosed.

14 Claims, 3 Drawing Sheets

(56) References Cited

U.S. PATENT DOCUMENTS

| | | | |
|---|---|---|---|
| 8,203,965 B1 | 6/2012 | Vijendra et al. | |
| 8,285,874 B2 | 10/2012 | Salmi et al. | |
| 8,300,554 B1 | 10/2012 | Vijendra et al. | |
| 8,327,341 B2 | 12/2012 | Stark | |
| 2002/0194045 A1* | 12/2002 | Shay et al. | 705/8 |
| 2002/0194317 A1* | 12/2002 | Kanada et al. | 709/223 |
| 2003/0225801 A1 | 12/2003 | Devarakonda et al. | |
| 2004/0230681 A1* | 11/2004 | Strassner et al. | 709/226 |
| 2004/0243692 A1* | 12/2004 | Arnold et al. | 709/220 |
| 2006/0005228 A1 | 1/2006 | Matsuda | |
| 2006/0069863 A1 | 3/2006 | Palmer et al. | |
| 2006/0184490 A1 | 8/2006 | Heim et al. | |
| 2006/0288409 A1 | 12/2006 | Bartal et al. | |
| 2007/0011331 A1 | 1/2007 | Morimoto et al. | |
| 2007/0094199 A1 | 4/2007 | Deshpande et al. | |
| 2007/0294406 A1* | 12/2007 | Suer et al. | 709/226 |

OTHER PUBLICATIONS

Magoutis (Magoutis et al., "Galapagos: Automatically Discovering Application-Data Relationship in Networked System", 10th IFIP/IEEE International Symposium on Integrated Network Management, May 2007).*

Ashley et al., "From Privacy Promises to Privacy Management: A New Approach for Enforcing Privacy Throughout an Enterprise", ACM New Security Paradigms Workshop, 2002, p. 43-50, Virginia Beach.

Backes et al., "A Toolkit for Managing Enterprise Privacy Policies", 8th European Symposium on Research in Computer Security (ESORICS), 2003, p. 162-180, LNCS 2808, Springer-Verlag, Berlin 2003.

Baker et al., "Requirements for IP Version 4 Routers", Internet RFC1812, Jun. 1995, p. 1-175.

Bauer et al., "Composing Security Policies with Polymer", 2005 ACM SIGPLAN Conference on Programming Language Design and Implementation (PDLI'05), p. 305-314, ACM SIGPLAN Notices 40/6 (2005).

Beigi et al., "Policy Transformation Techniques in Policy-based Systems Management", Proceedings of the Fifth IEEE International Workshop on Policies for Distributed Systems and Networks (POLICY 04').

Blake et al., "An Architecture for Differentiated Services", Internet RFC 2475, Dec. 1998, p. 1-36.

Chiueh et al., "Sago: A Network Resource Management System for Real-Time Content Distribution", In Proceedings of the International Conference on Parallel and Distributed Systems (ICPADS'02), Dec. 2002, pp. 557-562, ROC, National Central University, Taiwan.

Davie et al., An Expedited Forwarding PHB (Per-Hop Behavior), Internet RFC 3246, Mar. 2002, pp. 1-16.

Dulay et al., "A Policy Deployment Model for the Ponder Language", 7th IFIP/IEEE International Symposium on Integrated Network Management (IM' 2001), May 2001, pp. 84-100, IEEE Press, Seattle.

Giblin et al., Regulations Expressed As Logical Models (REALM), 18th Annual Conference on Legal Knowledge and Information Systems (JURIX 2005), pp. 37-48, IOS Press, Amsterdam.

Guerrero et al., "Ontology-Based Policy Refinement Using SWRL Rules for Management Information Definitions in OWL", 17th IFIP/IEEE International Workshop on Distributed Systems: Operations and Management (DSOM 2006), 2006, pp. 227-232, LNCS 4269, Springer-Verlag, Berlin.

Guttman et al., "Filtering Postures: Local Enforcement for Global Policies", Proc. IEEE Symp. on Security and Privacy, 1997.

Guttman et al., "Rigorous automated network security management", International Journal of Information Security, 2005, 4(1-2).

Heinanen et al., "Assured Forwarding PHB Group", Internet RFC 2597, Jun. 1999, pp. 1-11.

Karjoth et al., "Platform for Enterprise Privacy Practices: Privacy-enabled Management of Customer Data", 2nd Workshop on Privacy Enhancing Technologies (PET 2002), 2003, pp. 69-84, LNCS 2482, Springer-Verlag, Berlin.

Joukov et al., "Internet Worms As Internet-Wide Threat", Research Proficiency Examination Report, Computer Science Department of Stony Brook University, Sep. 2003.

Linehan et al., "SBVR Use Cases, Presentation at AAAI Spring Symposium, 'AI Meets Business Rules & Process Management'", Mar. 26, 2008, IBM Corporation.

Lodderstedt et al., "SecureUML: A UML-Based Modeling Language for Model-Drive Security", 5th International Conference on the Unified Modeling Language (UML), 2002.

Magoutis et al., "Galapagos : Automatically Discovering Application-Data Relationships in Networked Systems", 10th IFIP/IEEE International Symposium on Integrated Network Management, May 2007, Germany.

Pfitzmann, "Multi-layer Audit of Access Rights", 4th VLDB Workshop on Secure Data Management (SDM'07), 2007, pp. 18-32, LNCS 4721, Springer-Verlag, Berlin.

Porto De Albuquerque et al., "Improving the Configuration Management of Large Netwrok Security Systems", 16th IFIP/IEEE International Workshop on Distributed Systems:Operations and Management (DSOM 2005), pp. 36-47, LNCS 2775, Springer-Verlag, Berlin.

Powers et al., "EPAL Translation on the The Freedom of Information and Protection of Privacy Act", V1.1, Mar. 11, 2004, IBM and Information and Privacy Commissioner, Ontario.

Powers, "Structured Policy Management for Regulatory Compliance", presented at IBM Rational Software Development Conference, Jun. 2006, Orlando, Florida, USA.

Raj et al., "Transformation of SBVR Business Design to UML Models", 1st India Software Engineering Conference (ISEC '08), Feb. 19-22, 2008, ACM 2008, pp. 29-38.

Rubio-Loyola et al., "A Functional Solution for Goal-oriented Policy Refinement", 7th IEEE International Workshop on Policies for Distributed Systems and Networks (POLICY '06), 2006, IEEE.

Satoh et al., "Generic Security Policy Transformation Framework for WS-Security", IEEE International Conference on Web Services (ICWS 2007), pp. 513-520.

Shands et al., "SPICE: Configuration Synthesis for Policy Enforcement", McAfee Research Technical Report #04-016, Jun. 25, 2004.

Verma et al., "Policy based SLA Management in Enterprise Networks", IBM Thomas J Watson Research Center Proc. Policy 2001: International Workshop on Policies for Distributed Systems and Networks.

Verma, "Simplifying Network Administration Using Policy Based Management", IBM Research Report, RC22114 (W0107-013), Jul. 17, 2001.

Yuan et al., "Fireman: A Toolkit for FIREwall Modeling and ANalysis", Proceedings of the 2006 IEEE Symposium on Security and Privacy (S&P'06), 2006, pp. 199-213.

IBM Websphere MQ, Version 7.0, IBM Corporation Software Group, IBM Corporation, Mar. 2008.

U.S. Office Action dated Jun. 6, 2011 in connection with the parent application U.S. Appl. No. 12/134,933, filed Jun. 6, 2008.

U.S. Final Office Action dated Jan. 6, 2012 in connection with the parent U.S. Appl. No. 12/134,933, filed Jun. 6, 2008.

U.S. Office Action dated Apr. 21, 2013 issued in related U.S. Appl. No. 13/553,342.

* cited by examiner

METHOD TO AUTOMATICALLY MAP BUSINESS FUNCTION LEVEL POLICIES TO IT MANAGEMENT POLICIES

CROSS REFERENCE TO RELATED APPLICATION

This application is a continuation of U.S. patent application Ser. No. 12/134,933, filed Jun. 6, 2008 the entire content and disclosure of which is incorporated herein by reference.

BACKGROUND OF THE INVENTION

1. Field of the Invention

The present invention generally relates to transforming a high-level policy to a low-level policy. More particularly, the present invention relates to transforming a high-level policy to a low-level policy by utilizing an automated discovery tool that discovers data dependency between high-level objects and low-level objects.

2. Description of the Prior Art

Low-level objects (e.g., devices or IT (Information Technology) resources) are managed not at a high layer (e.g., an application layer in OSI (Open System Interconnection) 7 layer) but at a low layer (e.g., a physical layer in an OSI 7 layer). Therefore, rules or policies at the high layer are not directly reflected on operating low-level objects. Furthermore, most of low-level objects operate based on multi-hop dependences (e.g., an application depends on a database. The database relies on a file system.). A high-level policy (i.e., a rule which controls the high layer; e.g., a business policy) does not usually describe the multi-hop dependencies.

Beigi et al. "Policy Transformation Techniques in Policy-based Systems Management", POLICY 2004, p. 13-24 discusses a policy transformation module for transforming a high-level business-oriented policies into lower-level technology-oriented policies. The module accepts the policies (e.g., a high-level policy or low-level policy) from a system administrator and converts them from a high-level policy to a low-level policy or vice versa. Ashley et al. "From Privacy Promises to Privacy Management", A New Approach for Enforcing Privacy Through out an Enterprise, ACM New Security Paradigms Workshop (NSPW), 2002, p. 43-50 discusses deploying a policy to an IT system by following steps:

1. Mapping a data type in a privacy policy to PII (Personal Identification Information) stored in the IT system.
2. Mapping data users in the privacy policy to enterprise roles in the IT system.
3. Mapping tasks that the IT system and applications perform into a policy defined in business purposes.

However, policies (e.g., a high-level policy or low-level policy (i.e., a rule which controls the low layer)) to manage low-level objects are created mostly manually and do not accurately reflect business priorities (e.g., a priority assigned to an application). Currently, there is no method or system for an automatic policy transformation from a high-level policy to a low-level policy. Sometimes, changes to the policies are too slow to keep pace with changes in business priorities.

Therefore, it is highly desirable to provide a system or method for automatically transforming a high-level policy to a low-level policy. The low-level policy reflects up-to-date business priorities in the high-level policy.

SUMMARY OF THE INVENTION

In one embodiment, there is provided a computer-implemented method for transforming a high-level policy associated with a business layer to a low-level policy associated with an IT (Information Technology) layer comprising:
identifying high-level objects in the high-level policy;
identifying low-level objects in the IT layer;
discovering a data dependency between the high-level objects and the low-level objects;
mapping the high-level objects to related low-level objects in the IT layer; and
mapping the high-level policy to the low-level policy by applying the discovered data dependency and by substituting the high-level objects with the related low-level objects.

In another embodiment, there is provided a computer-implemented system for transforming a high-level policy associated with a business layer to a low-level policy associated with an IT (Information Technology) layer comprising:
means for identifying high-level objects in the high-level policy;
means for identifying low-level objects in the IT layer;
means for discovering a data dependency between the high-level objects and the low-level objects;
means for mapping the high-level objects to related low-level objects in the IT layer; and
means for mapping the high-level policy to the low-level policy by applying the discovered data dependency and by substituting the high-level objects with the related low-level objects.

In one embodiment, there is provided a computer-implemented method for transforming a low-level policy associated with an IT (Information Technology) layer to a high-level policy associated with a business layer comprising:
identifying low-level objects in the low-level policy;
identifying high-level objects in the business layer;
discovering a data dependency between the low-level objects and the high-level objects;
mapping the low-level objects to related high-level objects in the business layer; and
mapping the low-level policy to the high-level policy by applying the discovered data dependency and by substituting the low-level objects with the related high-level objects.

In another embodiment, there is provided a computer-implemented system for transforming a low-level policy associated with an IT (Information Technology) layer to a high-level policy associated with a business layer comprising:
means for identifying low-level objects in the low-level policy;
means for identifying high-level objects in the business layer;
means for discovering a data dependency between the high-level objects and the low-level objects;
means for mapping the low-level objects to related high-level objects in the business layer; and
means for mapping the low-level policy to the high-level policy by applying the discovered data dependency and by substituting the low-level objects with the related high-level objects.

As an exemplary embodiment, a method and system for mapping a high-level policy to a low-level policy in a traffic shaping is disclosed.

As an exemplary embodiment, a method and system for transforming a high-level policy to a low-level policy in data retention is disclosed.

BRIEF DESCRIPTION OF THE DRAWINGS

The objects, features and advantages of the present invention will become apparent to one of ordinary skill in the art, in view of the following detailed description taken in combination with the attached drawings, in which.

DETAILED DESCRIPTION OF THE PREFERRED
EMBODIMENTS

A high-level policy is a description p (e.g., structured data or text) with recognizable parameters $h_1, \ldots, h_n$, which are high-level objects (e.g., a customer contact information). A mapping is a relation M between a set H of high-level objects and a set L of low-level objects. The sets H and L and the mapping M may be defined specifically for transforming the policy p, but typically exist more generally, e.g., as a CMDB (configuration management database) or the results of an automated discovery tool (e.g., Galapagos) run. Galapagos is described in "Galapagos: Automatically Discovering Application-Data Relationships in Network Systems", Kostas Magoutis, et al., $10^{th}$ IFIP/IEEE International Symposium on Integrated Network Management, Germany, May 2007, hereinafter "Magoutis". Therefore, the whole contents and disclosure of Magoutis is incorporated by a reference as if fully set forth herein.

For high-level objects $h_1, \ldots h_n \epsilon H$ and low-level objects $l_1, \ldots, l_n \epsilon L$, the mapping M(h) can be defined as $\{l \epsilon L | (h, l) \epsilon M\}$ associating a set of high-level objects with a set of related low-level objects. Then, an induced policy transformation from the high-level policy p to a low-level policy p' maps $p(h_1, \ldots, h_n)$ to $p' := p(M(h_1), \ldots, M(h_n))$. It is presupposed that the high-level policy p comes from a set P of high-level policies, where replacing any parameter (i.e., a high-level object) $h_j$ by a subset of L makes a valid low-level policy. If one can only replace a parameter $h_j$ by a single element of L, then p is transformed into a set of policies $P' := \{p(l_1, \ldots, l_n) | (h_j, l_j) \epsilon M \text{ for all } j\}$, where P' is a set of low-level policies.

Figure 1:
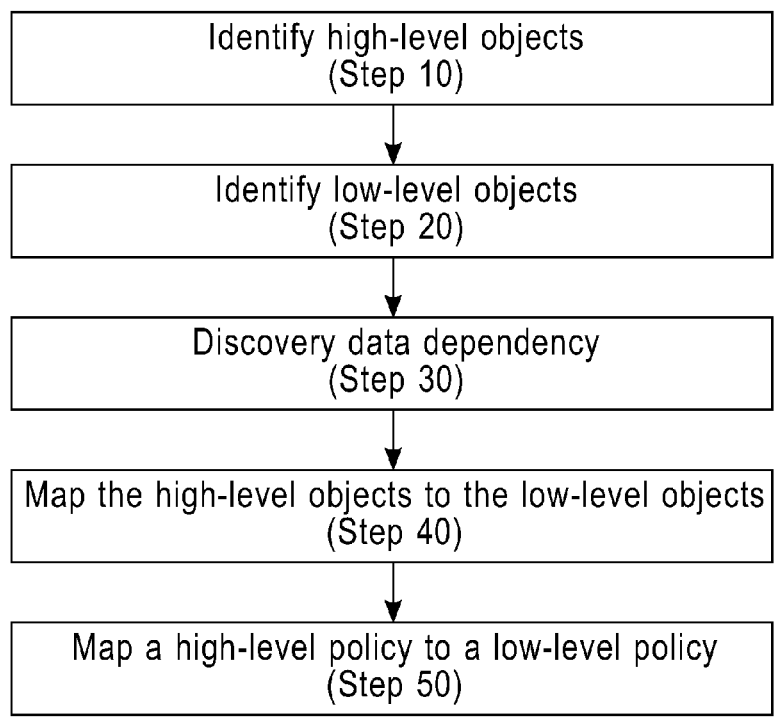
FIG. 1 depicts a flowchart that one embodiment of the present invention employs.

FIG. 1 illustrates a flowchart that one embodiment of the present invention employs. At step 10, high-level objects are identified in a high-level policy (e.g., manually or by parsing). In one embodiment, the high-level objects can be identified by identifying nouns and verbs in the high-level policy, as objects are identified in OOD (Object Oriented Design). For example, business units (e.g., a business organization (e.g., a bank), people in a business organization) defined in a high-level policy are examples of high-level objects. In one embodiment, a business action (e.g., accessing financial data) stated in a high-level policy can be considered a high-level object. In another embodiment, the high-level objects are identified by their placement in the structure of a structured document (e.g., a column in a spreadsheet, or a named XML element in an XML document).

At step 20, low-level objects are identified at a low layer. In one embodiment, low-level objects can be identified by identifying all the available technical resources (e.g., IP address, port numbers) at the low layer. Available storage space (e.g., a non-volatile memory) or available bandwidth is an example of low-level objects at a low layer. At step 30, an automated discovery tool (e.g., Galapagos) is used to discover all or part of mapping between high-level objects and low-level objects. The automated discovery tool discovers data dependencies between data objects (e.g., a file). In one embodiment, the automated discovery tool discovers end-to-end data and application dependency. An end-to-end data dependency is dependency of data objects starting from a high layer (e.g., an application layer in OSI 7 layer) to a low layer (e.g., a physical layer in OSI 7 layer). For example, the automated discovery tool may discover a data object depends on a database table (e.g., a data object is defined or described in a database table). The database table depends on a file. The end-to-end application dependency is a dependency of applications across multiple layers. For example, an application depends on a database. The database depends on a file system. In one embodiment, the automated discovery tool discovers end-to-end application data dependency. The end-to-end application data dependency means both end-to-end data dependency and end-to-end application dependency as well as dependency between software components on data objects. For example, a data object depends on an application A. The application A depends on an application B. In another embodiment, the automated discovery tool keeps track of transformation and ownership of a data object (e.g., a file). For example, the automated discovery tool traces who edited a particular file and who emailed the particular file to a user.

At step 40, the high-level objects are mapped to related low-level objects. Relationships between high-level objects and low-level objects are discovered by the automated discovery tool. A related low-level object corresponding to a high-level object is identified by the automated discovery tool. For example, a high-level policy may state "Control data for manufacturing equipment have priority over financial data". Then, a high-level object "Control data for manufacturing equipment" may be mapped to a low-level object such as "source address x.y.z", after the automated discovery tool discovers that the high-level object "Control data for manufacturing equipment" corresponds to the low-level object "source address x.y.z". A high-level object "financial data" may be mapped to a low-level object such as "source address x.y.a", after the automated discovery tool discovers a relationship (e.g., the financial data is transported through the source address x.y.a.) between "financial data" and "source address x.y.a".

At step 50, a high-level policy is mapped to a low-level policy by applying discovered data dependency between the high-level objects and low-level objects and by substituting high-level objects with the related low-level objects. For example, a high-level policy stating "Control data for manufacturing equipment have priority over financial data" is mapped to a low-level policy stating "source address x.y.z have priority over source address x.y.a", after discovering data dependency between a high-level object "control data for manufacturing equipment" and a low-level object "source address x.y.z" and data dependency between a high-level object "financial data" and a low-level object "source address x.y.a". Or, the high-level policy stating "Control data for manufacturing equipment have priority over financial data" is mapped to a low-level policy stating "priority.source address x.y.z>priority.source address x.y.a", after substituting a high-level object "control data for manufacturing equipment" with a low-level object "priority.source address x.y.z", substituting a high-level object "have priority over" with a low-level object ">", and substituting a high-level object "financial data" with a "priority.source address x.y.a". Data dependencies between the high-level objects and the low-level objects are discovered by an automated discovery tool, before substituting the high-level objects with the low-level objects.

In one embodiment, all the steps in FIG. 1 are fully automated (i.e., does not require any manual intervention). In another embodiment, all the steps in FIG. 1 operate manually. In alternative embodiment, some or all the steps in FIG. 1 are partially automated. In one embodiment, some steps in FIG. 1 are operated manually and other steps are partially or completely automated.

Figure 2:
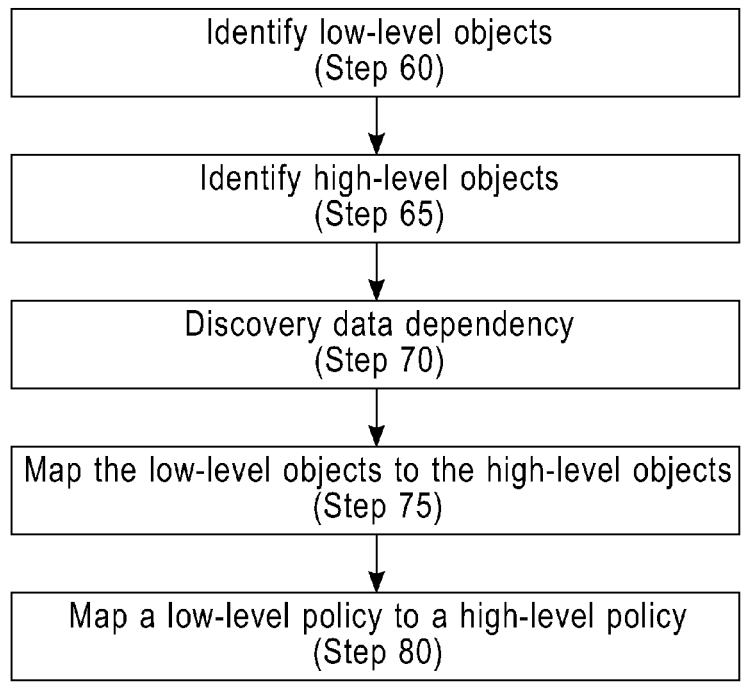
FIG. 2 depicts a flowchart that another embodiment of the present invention employs.

FIG. 2 depicts the transformation of a low-level policy at a low layer to a high-level policy at a high layer. At step 60, low-level objects are identified in a low-level policy. In one embodiment, for example, the low-level objects are identified by identifying nouns and verbs in the low-level policy as objects are identified in OOD (Object Oriented Design). At step 65, high-level objects are identified at a high layer. In one embodiment, all available high-level resources (e.g., people, organizations, business units, etc.) may be identified as high-level objects. At step 70, an automated discovery tool (e.g., Galapagos) discovers data dependency between low-level objects and high-level objects. In one embodiment, the automated discovery tool discovers an end-to-end data dependency between low-level objects and high-level objects, an end-to-end application dependency between low-level objects and high-level objects, and an end-to-end application data dependency between low-level objects and high-level objects.

At step 75, the low-level objects are mapped to related high-level objects. Relationships between low-level objects and high-level objects are discovered by the automated discovery tool. A related high-level object corresponding to a low-level object is identified by the automated discovery tool. For example, a low-level policy may state "source address x.y.z have priority over source address x.y.a". Then, a low-level object "source address x.y.z" may be mapped to a high-level object such as "Control data for manufacturing equipment", after the automated discovery tool discovers that the low-level object "source address x.y.z" corresponds to the high-level object "Control data for manufacturing equipment". A low-level object such as "source address x.y.a" may be mapped to a high-level object "financial data", after the automated discovery tool discovers a relationship (e.g., the source address x.y.a is used for transporting the financial data.) between "source address x.y.a" and "financial data".

At step 80, a low-level policy is mapped to a high-level policy by applying discovered data dependencies between low-level objects and high-level objects, and by substituting the low-level objects with related high-level objects. For example, a low-level policy stating "source address x.y.z have priority over source address x.y.a" is mapped to a high-level policy "control data for manufacturing equipment have priority over financial data", after discovering data dependency between a low-level object "source address x.y.z" and a high-level object "control data for manufacturing equipment" and discovering data dependency between a low-level object "source address x.y.a" and a high-level object "financial data".

In one embodiment, all the steps in FIG. 2 are fully automated (i.e., does not require any manual intervention). In another embodiment, all the steps in FIG. 2 operate manually. In alternative embodiment, all the steps in FIG. 2 are partially automated.

In one embodiment, a syntax transformation is performed between a high-level policy and a low-level policy, after mapping high-level objects to low-level objects. Syntax transformation is implemented by changing the structure or formation of a high-level policy when the high-level policy is mapped to a low-level policy. For example, without a syntax transformation, a high-level policy stating "control data for manufacturing equipment have priority over financial data" is mapped to "source address x.y.z have priority over source address x.y.a", after mapping a high-level object "control data for manufacturing equipment" to a low-level object "source address x.y.z" and mapping a high-level object "financial data" to a low-level object "source address x.y.a". However, with a syntax transformation, a template (e.g., X have priority over Y) of the high-level policy is changed, when the high-level policy is mapped to a low-level policy. For example, a high-level policy stating "control data for manufacturing equipment have priority over financial data" is mapped to "priority of source address x.y.a<priority of source address x.y.a". In this example, a high-level object "control data for manufacturing equipment" is still mapped to a low-level object "source address x.y.z". A high-level object "financial data" is still mapped to a low-level object "source address x.y.a". However, a syntax transformation changes template (e.g., X have priority over Y) of the high-level policy into a different template (e.g., priority of Y<priority X). In one embodiment, the syntax transformation changes verbs in a high-level policy with a mathematical or logical expression in low-level policy. In another embodiment, a syntax in low-level policy is a list. For example, a high-level policy stating "control data for manufacturing equipment have priority over financial data" is mapped to a low-level policy (x.y.z, x.y.a), where an earlier list element has higher priority. In one embodiment, the syntax transformation is performed by a compiler, which transforms a high-level language to a low-level language.

In one embodiment, a high layer refers to a business layer (i.e., a layer where priorities of different applications are determined, a layer where a business rule is made, or a layer residing above an application layer in OSI 7 layer or above an application layer in TCP/IP model). A low layer refers to an IT (Information Technology) layer (i.e., a layer where software applications and computer hardware communicate each other). In another embodiment, the high layer is an application layer (e.g., an application layer in OSI 7 layer or an application layer TCP/IP model). A low layer is an infrastructure layer (e.g., a physical layer in OSI 7 layer or a physical layer in TCP/IP model). In one embodiment, the high layer includes an application layer, a presentation layer, and a session layer in the OSI 7 layer. The low layer includes a data link layer and physical layer in the OSI 7 layer. In one embodiment, the high layer is a regulation layer (i.e., a layer where a regulation or legal rule is made). The low layer is a business model layer (i.e., a layer where a description that are used by enterprises to represent various aspects of its business, including its purpose, offering, strategies, infrastructure, organizational structure, trading practices, and operational processes is stated).

In one embodiment, transforming a high-level policy to a low-level policy can occur across multiple layers. For example, a policy A stated in a business layer is mapped to a policy A' stated in an application layer. The policy A' is mapped to a policy A" stated in an infrastructure layer.

In one embodiment, a high-level policy includes, but is not limited to, an access control policy, a privacy policy, an auditing policy, a firewall policy, a security policy, a monitoring policy, a traffic shaping policy, a data retention and storage policy, a workload distribution policy, a device configuration policy, and a business policy. The high-level policy is stated as logic (e.g., and, or, not), condition-action pair (e.g., If A is true, does B), and event-action pair (e.g., If C occurs, does D).

Figure 3:
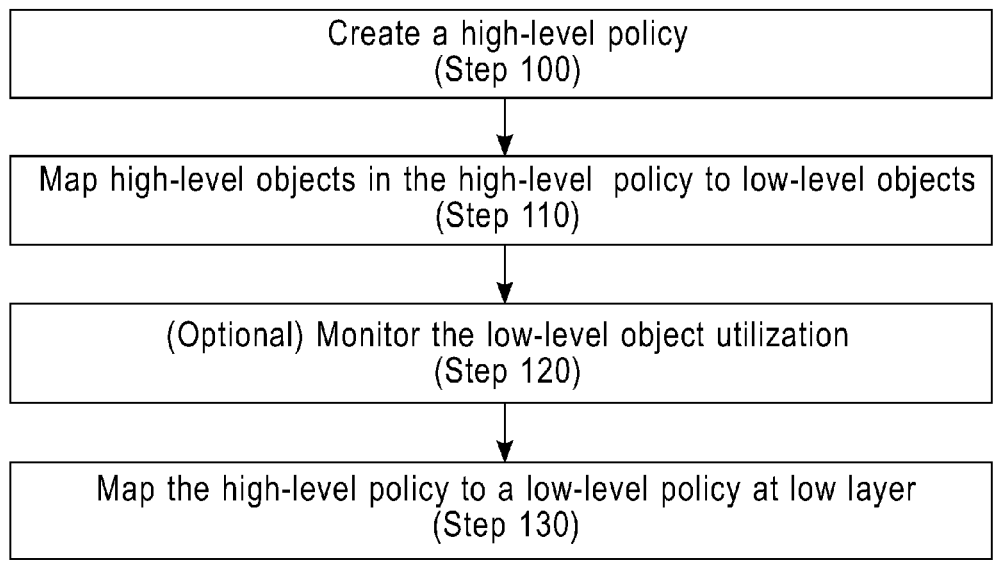
FIG. 3 depicts a flowchart that another embodiment of the present invention employs.

FIG. 3 illustrates a flow diagram of one embodiment of the present invention. At step 100, a high-level policy is created. The high-level policy states high-level objects (e.g., business units, people, business actions) and priorities of high-level objects. At step 110, high-level objects in the high-level policy is mapped to low-level objects. In one embodiment, mapping between high-level objects and low-level objects are performed manually. In another embodiment, mapping between high-level objects and low-level objects are performed by an automated discovery tool (e.g., Galapagos).

At step 120, constituting an optional step, utilization of low-level objects (e.g., storage space, bandwidth) is monitored. In one embodiment, IBM Tivoli® Network Manager software or Windows® Task Manager™ is used to measure utilization of the low-level objects. At step 130, the high-level policy is mapped to a low-level policy by performing following steps:

4. Map high-level objects to low-level objects by utilizing an automated discovery tool (e.g., Galapagos).
5. If several high-level objects are mapped to a low-level object and if there are different priorities between these mapping, highest priority is assigned all these mapping between the several high-level objects and the low-level object. For example, a high-level policy A gives a high-level object B the priority 3 (i.e., highest priority among priorities 1, 2, and 3). The high-level policy A also gives a high-level object C the priority 1 (i.e., lowest priority among priorities 1, 2, and 3). The mapping from high-level objects to low-level objects maps both the high-level object B and the high-level object C to the low-level object D. For instance B and C may be two applications running under the same IP address D, or they may be two documents stored on the same storage system D. To resolve a conflict (i.e., a different priority) between the two priorities that the policy mapping will assign to the low-level object D, the highest priority (e.g., priority 3) is assigned to the low-level object D.
6. Alternatively, if several high-level objects are mapped to a low-level object and if there are different priorities between these mapping, an average priority is assigned to all these mapping between the several high-level objects and the low-level object. For example, a high-level policy A gives a high-level object B the priority 3 (i.e., highest priority among priorities 1, 2, and 3). The high-level policy A also gives a high-level object C the priority 1 (i.e., lowest priority among priorities 1, 2, and 3). The mapping from high-level objects to low-level objects maps both the high-level object B and the high-level object C to the low-level object D. For instance B and C may be two applications running under the same IP address D, or they may be two documents stored on the same storage system D. To resolve a conflict (i.e., a different priority) between the two priorities that the policy mapping will assign to the low-level object D, a weighted average priority (e.g., priority 2.5) is assigned to the low-level object D. Alternatively, a normal average priority (e.g., priority 2) of the two high-level policies is assigned to the low-level object D.
7. Mapping between high-level objects and low-level objects are dynamically changed to reflect current utilization of low-level objects. For example, if a low-level object A is fully utilized, mapping a high-level object to the low-level object A is not considered anymore. In one embodiment, each low-level object has a specific policy. Hence, the mapping between the high-level objects and the low-level objects are changed according to the policies of the low-level objects. For example, a low-level object has a policy stating that the low-level object cannot be utilized after 1 PM. Then, after 1 PM, mapping to the low-level object from a high-level object is changed to a different mapping. Or, after 1 PM, mapping to the low-level object is not considered anymore.

In one embodiment, a high-level policy is mapped to a subset of a low-level policy that a low layer supports. If a high-level policy includes languages, phrases, or terms that cannot be realized as a low-level objects, the languages, phrases, or terms in the high-level policy are omitted while transforming the high-level policy to a low-level policy. In one embodiment, if some high-level objects do not find mapping to any low-level object, mapping these high-level objects are not performed. In another embodiment, if a part of a high-level policy does not find mapping to a low-level object, the part of the high-level object are not considered during transforming the high-level policy to a low-level policy. In this embodiment, the fixed part of the high-level policy may not be a high-level object. For example, if a high-level policy states "Web requests at URL ui should have a response time of 10 seconds" and there is no low-level object matching to "response time of 10 seconds", the "response time of 10 seconds" are not considered during transforming the high-level policy to a low-level policy.

As an exemplary embodiment, transforming a policy in a traffic shaper is now described. High-level policies for traffic shaping include priorities of network traffic belonging to different applications. For instance, such a high-level policy could be represented as a list of pairs $((a_1, p_1), (a_n, p_n))$, where each $a_i$ is an application name and the corresponding $p_i$ is a priority from the set $\{0, 1, 2, \ldots\}$, and where higher priorities mean more important traffic. In one embodiment, an application is an entire software package, e.g., an analytic software package bought as one piece from a vendor. The application can be an individual software element within a middleware server, e.g., a specific Enterprise Java Bean (EJB) within an IBM WebSphere Application Server (WAS). In one embodiment, the application can be identified by a service address rather than as a software piece, e.g., by a Uniform Resource Locator (URL) to which clients of the application can send requests, or by a web-service address in the sense of the Web Services Definition Language (WSDL). The application can be an abstract business application such as a web ordering process (e.g., ordering data in file server by submitting a URL in a web server).

In one embodiment, there are a variable number of ways to express a high-level policy. For instance, if a default application can be expressed as everything_else, then a pair $(a_n, p_n)$=(everything_else, 0) in a high-level policy indicates that all other traffic has lower priority than applications that occur explicitly in the list. For example, if a high-level policy states $\{(a_1, 3), (\text{everything\_else}, 0)\}$, then application $a_1$ has a priority 3 (i.e., highest priority among priorities 0, 1, 2, and 3) and other applications have priority 0 (i.e. lowest priority among priorities 0, 1, 2, and 3).

In one embodiment, a high-level policy can be in a different syntax than simply as comma-separated pairs (e.g., a pair $(a_n, p_n)$). For example, the high-level policy can be a plain language statement. A priority $p_i$ can have more meaning than just an order of importance. For example, a higher priority can mean more expensive network traffic.

In one embodiment, a high-level policy in a traffic shaping is expressed as $((a_1, a'_1, p_1), \ldots, (a_n, a'_n, p_n))$, where each $p_i$ denotes a priority of a traffic from an application $a_i$ to an application $a'_i$. One of ordinary skill in the art can understand different policy expressions can be used to describe a high-level policy.

In the traffic shaping, applications are high-level objects in a high-level policy. Priorities are elements of the high-level policy but are not substituted with low-level objects (e.g., IP addresses, port numbers). Priorities described in a high-level policy are transformed to priorities in a low-level policy through a syntax transformation.

Figure 4:
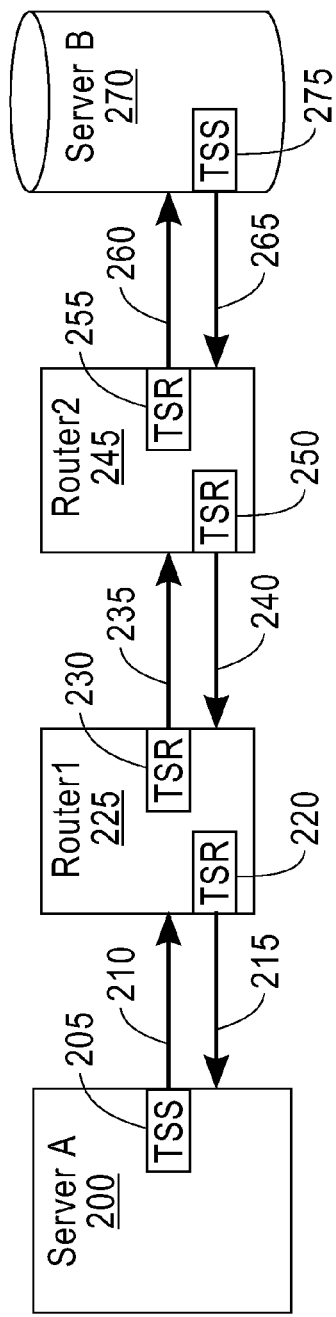
FIG. 4 depicts an environment that a traffic shaper is deployed.

Traffic shaping classifies network traffic for Quality of Service (QoS) purposes. FIG. 4 illustrates an overview of how QoS decisions are made. As shown in FIG. 4, network traffic is communicated between a server A 200 and a sever B 270 passing through a router 1 225 and a router 2 245. Arrows such as arrows 210 and 215 indicate packet deliveries between the Server A 200 and the router 225. Arrows such as arrows 235 and 240 indicate packet deliveries between the router 1 225 and the router 2 245. Arrows such as arrows 260 and 265 indicate packet deliveries between the router 2 245 and the server B 270. Some QoS decisions, e.g., which packets to drop in congestion situations (e.g., too many packets are delivered to a router, so some packets should not be further forwarded), are made in each router such as the router 225 and the router 245. Especially, a TSR (Traffic Shaper in Router) (e.g., TSR 220, TSR 230, TSR 250, and TSR 255) in each router makes the QoS decisions. To assist making the QoS decision in the TSRs (which have to act very fast), there are specific traffic shapers (e.g., TSS (Traffic Shaper in Server) 205, TSS 275) on the severs (e.g., the Server A 200 and the Server B 270) and at other network entry points (e.g., a network hub). The TSSs (e.g., TSS 205, TSS 275) make more complex QoS decisions and encode their result in a simpler way in a field in each packet for the TSRs (e.g., TSR 220, TSR 230, TSR 250, and TSR 255).

In one embodiment, network traffic received at TSSs (e.g., TSS 205, TSS 275) and TSRs (e.g., TSR 220, TSR 230, TSR 250, and TSR 255) are Internet Protocol (IP) traffic. In IP traffic, the TSRs (e.g., TSR 220, TSR 230, TSR 250, and TSR 255) typically look for QoS information in a specific 8-bit field of the IP packet headers. This field is called Type of Service (TOS) field or Differentiated Services (DS) field. The exact interpretation of this field (e.g., TOS field or DS field) in the TSRs varies, as well as algorithms used by the TSSs to put QoS information into this field (e.g., TOS field or DS field) vary. A well-known algorithm for the interpretation of TOS field or DS field is an IP precedence as defined in Section 5.3 in F. Baker, "Requirements for IP Version 4 Routers", The Internet Society, June 1995 (hereinafter Baker) the whole contents and disclosure of which is incorporates by a reference as if fully set forth herein. A well-known algorithm used by TSSs to put QoS information into TOS field or DS field is DiffSery discussed in S. Blake et al., "An Architecture for Differentiated Services", The Internet Society, December 1998 (hereinafter Blake, the whole contents and disclosure of which is incorporated by a reference as if fully set forth herein. A few standard classes of Differentiated Service (i.e., DiffServ) are Expedited Forwarding and Assured Forwarding. The Expedited Forwarding is discussed in B. Davie et al., "An Expedited Forwarding PHB (Per-Hop Behavior)", The Internet Society, March 2002 (hereinafter "Davie"). The Assured Forwarding is discussed in J. Heinanen "Assured Forwarding PHB Group", The Internet Society, June 1999 (hereinafter "Heinanen"), the whole contents and disclosure of both Davie and Heinanen are incorporated by references as if fully set forth herein.

In traffic shaping, a low-level policy refers to a policy for TSSs. In one embodiment, TSRs have fixed rules for handling the traffic according to the TOS or DS field set by the TSSs. Low-level objects managed by TSSs are pairs (IP, port), where IP is a range of IP addresses and port is a range of port numbers in TCP/IP communication protocol.

In one embodiment, every traffic shaper (TSSs and/or TSRs) knows both a source address and a target address of each packet, because the source address and the target address are part of an IP header and traffic shaper uses the addresses in making QoS decision. In another embodiment, TSSs explicitly receive additional information about an origin of the packet within the given server, and/or perform some analysis on content of the packet. Packets may include other content in addition to IP and TCP headers. TSSs may perform this analysis (i.e., an analysis on content of the packet) over multiple packets that belong to a same TCP connection or are otherwise correlated, e.g., belonging to a same FTP (file transfer protocol) connection.

In one embodiment, low-level objects managed by TSS are a triple (IP, port, in), where IP is a range of IP addresses, port is a range of port numbers in TCP/IP communication protocol, and in is an indicator representing information that a TSS obtains and evaluates besides IP addresses and ports. In this embodiment, a pair (IP, port) is a special case of a triple (IP, port, in), where in (i.e., indicator) is empty. In another embodiment, the traffic shaping is applied to ATM (Asynchronous Transfer Mode) network and/or SONET (Synchronous Optical Network).

In one embodiment of the traffic shaping, when mapping high-level objects (applications $a_1, \ldots, a_n$) to low-level objects (e.g., (IP, port, in)), a mapping $M_{imm}$ (i.e., "immediate mapping") is applied. $M_{imm}$ directly maps an application $a_i$ to the immediate addresses and ports of the software object $a_i$, i.e., to a triple ($IPa_i$, $pa_i$, $ina_i$). In another embodiment, an application $a_i$ has multi-tier data dependency in a middleware system.

Figure 5:
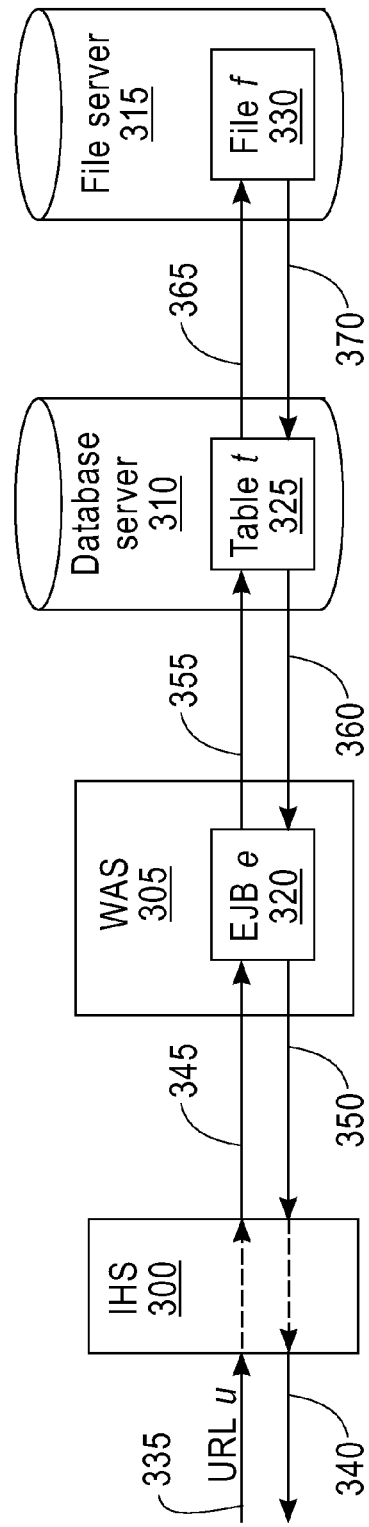
FIG. 5 depicts a multi-tier data dependency in traffic shaping.

FIG. 5 illustrates an example of an application $a_i$ having multi-tier data dependency in a middleware system. An application $a_i$, for purpose of discussion, may comprise a web_ordering (i.e., providing a URL and then obtaining data in a file server). An arrow 335 indicates a URL u is provided to a server device, e.g., IBM® HTTP Server (IHS), where provided URLs are managed. Then, the URL u is delivered, for example, to an Enterprise Java Bean (EJB) e 320 that resides on another server device, e.g., WebSphere® Application Server (WAS) via a communication link 345. The EJB e 320 transforms the URL u into a database query (e.g., in a SQL language), which is sent over a communication link 355. Then, a database server 310 access a file server 315 over a communication link 365 and fetches a file f 330 from the file server 315 over a communication link 370. Then, the database server 310 interprets the file f 330 as a table t 325. Then, the database server 310 selects data that the database query asked for (e.g., all rows in the table t 325 representing T-shirts for sale). The database server 310 sends these data over a communication link 360. The EJB e 320 transforms these data (e.g., about T-shirts) from a database query response format to another format (e.g., a user-friendly format) for presenting to a user and then sends the transformed data over a communication link 350. The IHS server 300 delivers the transformed data to the user over a communication link 340. Communication links in FIG. 5 include, but are not limited to, fiber optical cable, coaxial cable, wireless communication line, wired transmission line, etc.

In the example shown in FIG. 5, traffic priority of an application $a_i$ is applied to traffic between IHS, WAS, Database Server, and File Server, because all these traffic are needed to answer a request via URL $u_i$. In one embodiment, these traffic have a priority $p_i$ associated with the application $a_i$. A mapping called $M_{mid}$ maps an application $a_i$ to a set $M_{mid}(a_i) = \{u, e, t, f\}$. In one embodiment, by applying the mapping $M_{mid}$ in a high-level policy (e.g., substituting high-level objects based on the mapping $M_{mid}$), a middle-level policy (i.e., a policy to control middleware) is obtained. In one embodiment, a low-level policy is obtained by combining the mappings $M_{mid}$ and $M_{imm}$. For instance, if $M_{imm}$ maps the EJB e to a triple (IPe, pe, ine) of an IP address, a port, and an indicator, and similar for the other mid-level objects, a mapping M maps the application $a_i$ to $M(a_i)=\{(IPu, pu, inu), (IPe, pe, ine), (IPt, pt, int), (IPf, pf, inf)\}$.

Given the mapping M, a transformation from high-level policies to low-level policies follows automatically by substituting high-level objects with low-level objects using the given mapping M. For example, a high-level traffic-shaping policy $((a_1, p_1), \ldots, (a_n, p_n))$ is transformed into a low-layer policy $((M(a_1), p_1), \ldots, (M(a_n), p_n))$. A high-level traffic-shaping policy $((a_1, a'_1, p_1), \ldots, (a_n, a'_n, p_n))$ is transformed into a low-level policy $((M(a_1), M(a'_1), p_1), \ldots, (M(a_n), M(a'_n), p_n))$. For example, a high-level policy may be stated as $((a_i, 3), (everything\_else, 0))$, where $a_i$ is an application. Then with the mapping M, a low-level policy is obtained as like $(\{(IPu, pu, inu), (IPe, pe, ine), (IPt, pt, int), (IPf, pf, inf)\}, 3)$, (everything_else, 0)). Or, if each triple should be written with its own priority, the low-level policy is stated as (((IPu, pu, inu), 3), ((IPe, pe, ine), 3), ((IPt, pt, int), 3), ((IPf, pf, inf), 3), (everything_else, 0)).

In one embodiment, an automated discovery tool discovers a multi-tier dependency in middle-level objects through which the application $a_i$ is transmitted from a high layer to a low layer, the multi-tier dependency being expressed by a set $\{m_1, m_2, m_3, \ldots, m_k\}$, where $m_i$ indicating a middle-level object (e.g., EJB $e_i$ in FIG. 5) between the high layer and the low layer. A mapping $M(a_i)$ (i.e., a mapping a high-level object such as an application $a_i$ to low-level objects such as IP addresses, port numbers, and indicators) is constructed by combining the multi-tier dependency and the list of pairs of low-level objects. The mapping $M(a_i)$ is stated as like $M(a_i)=\{(IPm_1, pm_i, inm_1), (IPm_2, pm_2, inm_2), (IPm_3, pm_3, inm_3), \ldots, (IPm_k, pm_k, inm_k)\}$, where $M(a_i)$ indicating mapping associated with the application $a_i$ from the high-level policy to a low-level policy, $IPm_1$ indicating a range of IP address at a middle-level object $m_1$, $pm_1$ indicating a range of port numbers at middle-level object $m_1$, $inm_1$ indicating an indicator at a middle-level object $m_1$, $IPm_2$ indicating a range of IP address at a middle-level object $m_2$, $pm_2$ indicating a range of port numbers at a middle-level object $m_2$, $inm_2$ indicating an indicator at a middle-level object $m_2$, $IPm_3$ indicating a range of IP address at a middle-level object $m_3$, $pm_3$ indicating a range of port numbers at a middle-level object $m_3$, $inm_3$ indicating an indicator at a middle-level object $m_3$, $IPm_k$ indicating a range of IP address at a middle-level object $m_k$, an $pm_k$ indicating a range of port numbers at a middle-level object $m_k$, $inm_k$ indicating an indicator at a middle-level object $m_k$. Then, a low-level policy is derived from the mapping $M(a_i)$ and the high-level policy. In one embodiment, the low-level policy is stated as $((M(a_1), p_1), \ldots, (M(a_n), p_n))$, where $M(a_1)$ indicating mapping associated with the application $a_1$, $p_1$ is a priority of the application $a_1$, $M(a_n)$ indicating mapping associated with the application $a_n$, and $p_n$ is a priority of the application $a_n$.

If the multi-tier dependency between a high layer and a low layer is explicitly set, the multi-tier dependency is obtained by asking people, by a model-driven design (i.e., starting a design on a high layer and consistently implementing the design at lower layer) and a deployment tool (i.e., a tool for assisting and ensuring installation and upgrade of a server), and by a manual inspection. In one embodiment, the multi-tier dependency is discovered by an automated discovery tool (e.g., Galapagos). In one embodiment, the multi-tier dependency discovered by an automated discovery tool or by a model-driven design and a deployment tool applies to different middleware and servers as well as different instances of same middleware, e.g., multiple interacting WAS servers.

In one alternative embodiment, a high-level policy is enforced on a low layer by using mapping between high-level objects and low-level objects. This enforcement is done by explicit policy transformation (e.g., mapping high-level objects to low-level objects and then mapping a high-level policy to a low-level policy by substituting the high-level objects with low-level objects).

In one embodiment, after a low-level policy is derived from a high-level policy by the policy transformation, the derived low-level policy can be applied on existing traffic shapers at run-time. In one embodiment, a real-time policy transformation (i.e., transforming a high-level policy to a low-level policy) requires a fast decision-making. Therefore, in this embodiment, a mapping between high-level objects and low-level objects exists before starting policy transformation.

In one embodiment, priorities associated with applications are relative indications of a bandwidth needed. For example, if a high-level policy states as $((a_1, 3), (a_2, 1))$, traffic related to an application $a_1$ would get three times as much bandwidth as an application $b_i$. In another embodiment, the priorities is an absolute indications of bandwidth needed. For the example, if a high-level policy states as $((a_i, 3), (b_i, 1))$, an application $a_i$ obtains 3 Mbyte/sec as long as this bandwidth (i.e., 3 Mbyte/sec) is available, and an application $b_i$ obtains 1 Mbyte/sec. In one embodiment, priorities indicate latency. In another embodiment, priorities indicate service level objectives such as Service Level Agreement (SLA) (i.e., a part of a service contract where a level of service is formally defined).

From now on, an exemplary embodiment related to data retention is described. New laws and regulations make a lot of requirements on reliable data retention. This (i.e., reliable data retention) may involve quite complex policies, e.g., different types of data have to be stored for different periods of time, with different security requirements, and different requirements on accessibility. Storage devices at a low layer are recognized as low-level objects. Policy transformation (e.g., mapping high-level objects to low-level objects and then mapping a high-level policy to a low-level policy by substituting the high-level objects with low-level objects) enables right data to get stored in the right way automatically. In addition, the policy transformation helps using low-level objects in a suitable way for high-level data retention policies, which correspond to the actual regulations.

Retention policies (e.g., a high-level retention policy or a low-level retention policy) are applied at 3 layers: regulation layer (i.e., a layer where actual regulations or laws are stated; e.g., a high layer), a business model layer (i.e., a layer where a business model of an organization is defined, business model means a broad range of informal and formal description that are used by the organization to represent various aspects of its business, including its purpose, offering, strategies, infrastructures, organizational structures, trading practices, operational processes; e.g., a middle layer), and a storage layer (i.e., a layer where data within an organization is physically stored; e.g., a low layer). A mapping and a policy transformation occur between the regulation layer and the business model layer. Another mapping and policy transformation occur between the business model layer and the storage layer. By combining these two mappings, a mapping and a policy transformation between the regulation layer and the storage layer are obtained. Based on this mapping and policy transformation between the regulation layer and the storage layer, retaining data in a storage layer according to a high-level policy (e.g., regulation or retention policy) is enabled.

On the regulation layer, there are actual regulations, i.e., texts produced by lawmakers, regulatory bodies, and sometimes standardization institutions. In one embodiment, a retention policy is obtained from an actual regulation by describing the retention policy as XML document, or describing the retention policy as a table. A retention policy means a more structured version of retention requirements of the actual regulation. Obtaining the retention policy from the actual regulation is performed in the regulation layer (e.g., transforming the regulation into a table). In one embodiment, the retention policy reflects intent of the actual regulation as closely as possible.

On the business model layer, there is a business data model (BDM). The BDM means the highest level of how an enterprise or an organization represents data it holds. Most enterprises have such a BDM on the business model layer, i.e., in business terms in contrast to technology terms. If an enterprise has no BDM on the business model layer, the enterprise will typically at least have descriptions of database schemas (e.g., tables) or a content-management system (i.e., a system that keeps track of data that are less structured than typical database data, e.g., empty and filled forms or reports) above an actual storage device. Then the database schemas or a content-management system play the role of the BDM. If there is no business data model at all above the actual storage device, there will be no mapping between the regulation layer and the business model layer. There will be only a mapping and a policy transformation between the regulation layer and the storage layer.

On the business-model layer, many enterprises also have at least a partial business process model (BPM), (i.e., a model of activities that occur, a model of how those activities are ordered into processes, and a model of what data are handled in each activity). On the storage layer, there is a Data Storage System (DSS) (i.e., a system where data is stored in the storage layer). An enterprise may have more than one DSS.

A retention requirement in a regulation or standard typically describes a data type D (e.g., a high-level object) and an obligation pertaining to this data type, e.g., that data type have to be stored for 3 years in at least 2 places. An important example regulation is the US regulation SEC 17a-4 (U.S. Securities and Exchange Commission: Rule 17a-4—Records to Be Preserved by Certain Exchange Members, Brokers and Dealers). An example requirement from this regulation is its paragraph (b) 2: "Every such broker and dealer shall preserve for a period of not less than 3 years, the first two years in an accessible place: All check books, bank statements, cancelled checks and cash reconciliations." This requirement describes four data types D1=check_books, D2=bank_statements, D3=cancelled_checks, and D4=cash_reconciliations. To each of these four data types, the same two obligations apply: That the data shall be preserved for at least 3 years, and that they shall be preserved for at least 2 years in an accessible place. One of ordinary skill in the art can appreciate that diverse numbers of data types can be obtained from a regulation statement. For example, from the above example regulation statement, just one data type D_all=checks_etc can be obtained. However, it is preferred to keep an original textual formulation and to make simple definitions (e.g., keep four data types), when deriving data types in regulation layer. This will simplify the mapping between high-level objects (e.g., data types in the regulation layer) to lower-layer objects (e.g., data items in the storage layer). In the embodiment of data retention, the data types are objects (e.g., text, images, audio files, data files, etc.). The data items are physical objects to be stored (e.g., paper documents).

Languages for the retention policies (e.g. a high-level policy) on the regulation layer can be formulated in many ways according to the state of the art, e.g., as an XML schema (e.g., table) with certain context-sensitive restrictions (e.g., a restriction is changed depending on what a user is doing). In one embodiment, each retention policy is described as a retention policy matrix (e.g., a table 1). Each row of the retention policy matrix contains one retention requirement. The first column designates a data type (e.g., a high-level object); the other columns correspond to the different attributes required of a retention or storage. For instance, the second column may indicate a retention time: how long the data type needs to be retained, the third column may indicate a start event from which the retention time is measured, the fourth column may indicate the number of storage places where data (e.g., data type) is retained, the fifth column may indicate a type of places: characteristics of places (e.g., secure or separated) or requirements on the places, and the sixth column may indicate accessibility requirements of the places (e.g., whether the places are easy to access or not).

The table 1 provides an example for data type D2 from above. There were two retention requirements on D2, one for 3 years and one for 2 years. The start events from which these times are to be measured were not explicitly mentioned. The default interpretation for such cases (i.e., the start events are not explicitly mentioned) is that the retention time counts from the most recent update of the data (e.g., data type D2). In one embodiment, a legal expert determines an applicability of this default interpretation for a specific data type. In the last row of table 1, there is another data type D5 which includes a requirement like following: "Employment data must be preserved for 10 years after the end of deployment in at least two secure and geographically separated places."

TABLE 1

Retention policy

| Data type | Retention time | Start event(s) | Number of places | Type of place | Accessibility |
|---|---|---|---|---|---|
| D2 = bank_statements | 3 | (last update) | 1 | — | — |
| D2 = bank_statements | 2 | (last update) | 1 | — | easy |
| D5 = employment_data | 10 | end of employment | 2 | secure, separated | — |

Each column heading in the table 1 is called as a retention attribute (RA). In one embodiment, a retention policy (e.g., a row in table 1) can be flexible in allowing new retention attributes to be defined. One of ordinary skill in the art understands that more predefined retention attributes can be in the table 1. For example, the column "type of place" could be further refined, in particular for the case where storage in multiple places is required.

If data has several retention requirements, these requirements must be fulfilled by adding new rows in the table or adding new attributes in the table. Especially, if these requirements have non-default start events, then each of these requirements defines a time that the retention time starts. For example, a litigation event requires additional retention time, (e.g., if one has to store bank statements for 2 years after every money-laundering enquiry into them, one can only delete them if 3 years have passed since the bank statement was made, and 2 years have passed since every money laundering enquiry for this bank statement, if there was such an enquiry). In one embodiment, if there is a different interpretation for a requirement, each interpretation can have each row in the table. In another embodiment, if there are different interpretations for a requirement, the interpretations are combined in a row in the table. For example, if there are different interpretations of a start event of a data type, the different interpretations are combined and written in a start event column within a row of the data type (e.g., within a retention policy of the data type).

Regulations (e.g., US regulation SEC 17a-4) may also include retention requirements for metadata (i.e., data being used for understanding, characteristics, and management of another data) such as indices and for relations between data types. Thus metadata and relations could be additional data types (e.g., additional objects). Metadata can be given rows of their own like data types, if the metadata have separate requirements. In one embodiment, if a regulation mentions metadata at all, then the metadata is treated like associated data (e.g., attributes). The relation between data and associated metadata, as well as other relations that are specifically required to be retained, can also be given rows in the table. If a regulation states that a relation must be retained, but does not mention any specific retention attributes, a default handling would be to use a weaker requirement among requirements on each retention attribute of a related data. A weaker requirement can be identified or defined like following: For instance, among the attributes in the table 1, Shorter retention time is weaker than longer.

Fewer storage places are weaker than more storage places.

Unspecified accessibility (i.e., hyphens in that column) is weaker than "easy" accessibility.

Retention policy (e.g., a high-level policy) on the regulation layer can be transformed to a similar, related or simpler retention policy (e.g., a high-level policy) before starting to map the retention policy to a middle-level policy (e.g., a retention policy stated in a business term) on a business model layer by performing one or more of:

a) Retention attributes with vague values can be refined with concrete values. For instance, the accessibility value "easy" in the table 1 may be replaced by a statement "within 10 minutes" or a similar concrete time period that reflects best practices or current interpretations of the regulation. Or, the accessibility value may be replaced by the statement "accessible by all customer-facing bank employees".

b) Retention policies (e.g., high-level policies) from different regulations can be compared and combined. If these policies are made from a same party, data types are compared each other and then same attributes are compared each other. If these policies are made from different parties, data types are compared each other and then semantically equivalent attributes are compared each other. When combining attributes, a "stronger" attribute value can be selected over a "weaker" attribute (e.g., a longer retention time is selected over a shorter retention time). In another embodiment, when combining policies, rows corresponding these policies can be simply appended. Given several requirements for a same data type, the requirements are compared and requirement(s) that are implied by a combination of other requirements are omitted.

c) Requirements can be made stronger but simpler. For instance, the first row and the second row of the table 1 can be combined as like storing data type D2 for the entire 3 years in an accessible place if storing the data (e.g., the data type D2) in the accessible place for last year is less costly than transferring the data to another place. A particular goal in this step is to reduce the number of rows in the table.

High-level objects in the retention policies on the regulation layer are the data types described in a regulation or standard. The high-level objects are mapped to objects of a BDM in the business model layer. This mapping is called as $M_{D1}$ (first data mapping).

The objects of the BDM, to which the high-level objects are mapped, are called data types of the BDM. In one embodiment, the objects of the BDM is a class (e.g., a set of attributes and methods) in an object-oriented programming, a data item (e.g., a text file, an image file, data file, etc.), a document type (e.g., MS word file, plain text file, etc.), and a data repository (i.e., a place storing data). In one embodiment, the objects of the BDM is related each other (e.g., the BDM may state which document types belong into which data repository).

In one embodiment, the mapping $M_{D1}$ needs a manual support, e.g., via a IBM® Rational® Data Architect product. For example, business ontology (i.e., an entirety of data types of the BDM and their relations) and a regulation ontology (e.g., the entirety of data types in the regulation, etc.) is mapped from the regulation layer to the business model layer manually. If a same ontology is used for several regulations or several business data models, respectively, then the mapping associated with the same ontology can be reused. In another embodiment, the mapping $M_{D1}$ is performed fully automatically by a data mapping tool (i.e., a tool for creating data element and mapping between two distinct data models; e.g., Altova MapForce®) and by a general language-analysis tool (i.e., a linguistic tool for analyzing a plain language; e.g., PLA—Plain Language Analysis Tool). The data mapping tool and the general language-analysis tool proposes a likely correspondence between high-level objects (e.g., data type on the regulation layer) and objects of the BDM (e.g., data type of the BDM). In one embodiment, a human expert verifies the likely correspondence generated from the data modeling tool and the general language-analysis tool.

The result of the mapping of a data type D from the regulation layer to a data type on the BDM may take different forms:

1. In the easiest case, there is an one-to-one mapping (i.e., a data type D exactly corresponds to a data type B on the BDM, i.e., $M_{D1}(D)=\{B\}$).
2. Sometimes, there is one-to-several mapping (i.e., there are several corresponding data types $B_i$ for $i=1, \ldots, n$ in BDM, i.e., $M_{D1}(D)=\{B_1, \ldots, B_n\}$). Each data type $B_i$ is handled according to retention requirements on D, as like one data type B in the first case is handled according to the retention requirements on D.
3. Sometimes, there is one-to-subtype mapping (i.e., D only corresponds to a subtype S of a data type B in BDM, where the subtype S has not been modeled in BDM). This means that the regulation makes finer distinctions among data than the distinctions made in the BDM. If the data types in BDM are extensible, an attribute "is_S" can be introduced into data type B for simple recognition of a subtype. The "is_S" attribute ensures that a BDM sets the additional attributes correctly when creating or manipulating data (e.g., subtype S). For an actual characterization of S within B, there are the following cases:

a) It is possible to rigorously characterize a subtype S using existing attributes of the data type B. In this case, "attributes" means a notion of parts of a data type, which is present in almost all data models (e.g., attributes in Unified Modeling Language). For instance, a check may have attributes payer, recipient, currency, and amount. For instance, if the regulation layer has a data type D6=checks_in_foreign_currency, but the BDM has only one data type B=check, a desired subtype S within B can be formulated by a formula "currency≠CHF", where "≠" means "not equal" and the check is assumed to be used in Switzerland. If an attribute "is_S" is introduced, a derived formula can be considered as a consistency requirement (e.g., a requirement that states that certain attributes must have values that are consistent with each other) within type B. In this example, the consistency requirement within type B can be expressed as like "is_S=true ⇔ currency≠CHF".

b) It is possible to rigorously characterize the subtype S using existing elements of the BDM, but not only of the data type B. For instance, with the check example as in Case a), let the regulation layer have a data type D7=checks_by_foreign_nationals. Further assume that the BDM has a second data type B2=Person with the attribute nationality, and let the attribute payer of a check be of type Person. Then a desired subtype S within B can be distinguished by a formula "payer.nationality≠Swiss", where the dot-notation means to look up a following attribute. If an attribute is_S is introduced, a derived formula can be considered as a consistency requirement for type B within the overall BDM. In this example, the consistency requirement within type B can be expressed as like "is_S=true ⇔ payer.nationality≠Swiss".

c) It may not be possible at all to rigorously characterize the subtype S using existing elements of the BDM. For instance, if the checks are treated in the receiving bank, no data records of type B2=Person may be available for payers. Then the data type D7 cannot be distinguished with existing information. If an attribute is_S is introduced, then the attribute is_S remains formally undefined.

4. Sometimes, there is one-to-union of several subtypes mapping (i.e., D corresponds to the union of several subtypes $S_i$ for i=1, . . . , n of data types $B_i$ for i=1, . . . , n, respectively in BDM). In one embodiment, "subtypes" $S_i$ is an entire types $B_i$.

In one embodiment, the mapping $M_{D1}$ follows a notation style: For every data type D of the regulation layer, the value of $M_{D1}(D)$ is a set $\{T_1, \ldots, T_n\}$, where n is a natural number or zero, and where each $T_i$ is either an entire type $B_i$ from the BDM or a subtype $S_i$ of such a data type $B_i$. Such a subtype $S_i$ is given as a triple $(B_i, f_i, c_i)$ where $c_i$ denotes the constraint and $f_i$ is a Boolean value stating whether the constraint is formal. If $f_i$=true, then $c_i$ is a formula over BDM that characterizes an element of $B_i$ as a member of subtype $S_i$ (Cases a and b above); otherwise $c_i$ is a natural-language description of the subtype $S_i$ (Case c above).

Two additional steps may be performed to verify completeness of mapping data types of the regulation layer to data types of the BDM:

a) Validate that the mapping (e.g., $M_{D1}$) maps each data type D from the regulation layer to a non-empty set on the BDM, and that this set seems to cover semantics of D. If not, validate carefully by other means if there are no data types on the BDM that correspond to data type D. For instance, for a data type D5=employment_data, every enterprise that is not a pure family business should be able to find corresponding data type in its BDM.

b) Search—if a BPM is given—or ask specifically for typical business processes that would handle data of type D, e.g., check handling for checks and human resources (HR) processes for employment data. Evaluate whether corresponding data types are completely modeled in BDM. If any data types are not yet modeled in the BDM, the data types have to be added on the BDM and then have to be considered as available data types on the BDM.

Some retention policies on the regulation layer include start events (e.g., column 3 in the table 1). A start event is a high-level object in the regulation layer that requires mappings, when transforming the retention policies on the regulation layer to lower layers (e.g., a business model layer or storage layer).

If there is only a default start event (e.g., "last update"), then the default start event is not explicitly mapped to an action in the business model layer. This is because a notion of last write access or last modification is implicitly available in the business model layer.

Other start events (e.g. non-default start events) have to be mapped to actions definable in or related to the BDM. This mapping is called as $M_{E1}$ (first event mapping). It is much simpler if the BDM is embedded into a BPM, i.e., if there is an explicit surrounding notion of business processes and actions. For instance, assume a data type D5 in the table 1 is mapped to a data type B5=employee_record of the BDM. Then a start event E=end_of_employment will be easily definable given the HR business processes of an enterprise by mapping the start event E to one specific action act, e.g., act=employment_contract_termination. Thus in this case $M_{E1}(E)=\{act\}$. The start event E can also be mapped to a set of several actions (if a granularity of actions is finer in the BPM than in the regulation) or one or more subsets of actions (if the granularity of actions is finer in the regulation than in the BPM). For the latter case (i.e., mapping the start event E to subsets of actions), action subtypes can be characterized, as subtypes of data types are characterized above.

If there is no BPM, it is tried to map the start event in terms of static data, i.e., a change in the BDM that corresponds precisely to the start event must be identified. In one embodiment, deriving this mapping (i.e., mapping the start event in terms of static data) will involve some manual skills. For example, if data model (i.e., an abstract expression that describes how data is represented and accessed) of the HR (Human Resources) records is only known, there is probably an attribute like "employment_status" with possible values like "regular" and "former". If "former" is the only attribute value that corresponds to a state after the end of employment, then the data model of the start event E for the data type B5=employee is the change of "employment_status" from any other value to "former". As the actual method to express such a model, a pair (pre, post) of a precondition and a postcondition can be used. This pair may be expressed in several ways known in the state of the art, e.g., the Object Constraint Language (OCL) associated with UML. Thus in this case (i.e., there is no BPM), $M_{E1}(E)=\{(pre, post)\}$. In the example, $M_{E1}(E)=\{(employment\_status≠former, employment\_status=former)\}$.

In one embodiment, mapping of policies from the regulation layer to the business model layer is done by substituting data types and start events in the retention policies on the regulation layer with corresponding objects on the business model layer. In particular, for each data type D defining a row of a retention policy matrix (e.g., table 1), the data type D is mapped to set $\{B_1, \ldots, B_n\}$ of entire data types of the BDM (e.g., $M_{D1}(D)=\{B_1, \ldots, B_n\}$). Attributes in D's row in a retention policy table (e.g., table 1) are replaced with attributes of each data type such as $B_i$ on the business model layer. For a retention attribute "start event", if the start event is not default start event, the start event is replaced by $M_{E1}(E)$ (i.e., an action or pair of precondition of the start event and postcondition of the start event, i.e., pair (pre, post)). Other retention attributes are unchanged because they are part of the retention policy itself. An entirety of these new attributes of a data type $B_i$ is called as retention attributes set (RAS).

In one embodiment, the BDM of an enterprise may be stored and manipulated in a BDM tool (i.e., a tool for creating a business data model instance by applying a business data model theory; e.g., IBM® Rational® Data Architect, DataArchitect from Sybase®, ProVisioni WorkBench from Proforma™ Corporation). If the BDM tool does not know about retention policies, to store the rention policies in the BDM tool nevertheless, a policy syntax transformation may be needed (e.g., a high-level policy described as a table as described above is transformed to a low-level policy expressed as a list).

In one embodiment, the BDM tools allow to add new attributes to existing data types on business model layer. Retention attributes, i.e., column headings of a retention policy matrix (e.g., table 1), can be defined as new attributes of existing data types on the business model layer. For instance, a data type B in the business model layer may obtain additional attributes "retention_time", "number_of_retention_places" etc.

If a data type D in the regulation layer corresponds to a subtype S of a data type B in the business model layer, there are two options:

The subtype S is redefined as a separate data type in the BDM. The separate data type has all the attributes from B (this may be done implicitly by inheritance from B to S if the BDM has an inheritance concept) and retention attribute set derived from data type D. If there is a BPM associated with the BDM, the BPM is changed so that each action in the BPM that used B so far makes the correct choice among S and the remaining type B' representing B without S. Changing the BPM is also needed if there are existing but unmodeled business processes on the data type B.

The BDM tools allow defining a set of multiple conditioned retention attribute sets for the data type B. Each of these conditioned retention attribute sets consists of a condition (f, c) and a RAS, where (f, c) characterizes the subtype S within B where c denotes a constraint and f denotes a Boolean value stating whether the constraint c is formal.

In one embodiment, the retention policy on the regulation layer potentially includes relations that have to be retained. If the BDM contains a notion of the relations, and the relations can have attributes (e.g., association classes in UML (Unified Modeling Language)), then a RAS is added to these relations as for data models.

A mapping $M_{E1}$ of start events can be represented in the tools on the business model layer. If there is an explicit BPM related to the BDM, then a start event E from the regulation layer is mapped to a set $M_{E1}(E)=\{act_1, \ldots, act_n\}$ of action types or subtypes from the BPM. An element (e.g., an attribute) can be added to each action $act_i$ in the BPM to characterize each action $act_i$ as a start event for corresponding data type B on the business model layer. If an action act is a start event for several such data types B, multiple elements can be added to the action act. Depending on a BDM tool used to represent the BPM, this addition (i.e., adding element(s) to an action) may simply be done as adding an attribute of the action or as modeling an event caused by the action. In one embodiment, the tool used to represent the BPM can have an explicit mechanism for events. Then, an event to be caused, i.e., an extension of a retention time for the data B, may also be explicitly modeled. If there is no explicit BPM related to the BDM, each start event E from the regulation layer is mapped to a set $M_{E1}(E)=\{(pre_1, post_1), \ldots, (pre_n, post_n)\}$ of precondition and postcondition pairs. The precondition and postcondition pairs can be added to a corresponding data type B as attributes. In one embodiment, if the BDM includes an explicit notion of triggering (i.e., starting actions when certain conditions are fulfilled), each pair of a precondition and a postcondition is transformed into a trigger.

In one embodiment, the mapping of data types and start events is modified before the mapping is used for a policy transformation (i.e., transforming a high-level policy to a low-level policy). In the mapping $M_{D1}$, $M_{D1}(D)=\{T_1, \ldots, T_n\}$ is extended for some data types D:

If a $T_i$ is a subtype $S_i$ of a data type $B_i$, it may be simpler to replace the $T_i$ by $B_i$ unless there is a potential for conflict. If conflicting retention attributes are added to a set of defined retention attributes, then a conflict analysis is performed. The conflict analysis may result in which attributes are conflict each other and how the conflict can be avoided. The conflict analysis can be performed manually. In one embodiment, the conflict analysis is performed a conflict analysis software (i.e., software performing comparison of retention attributes).

In one embodiment, a condition defining the subtype $S_i$ is simplified, thus to extend $S_i$. For instance, clauses that use elements of the BDM other than attributes of $S_i$ can be deleted. Or, an extended formal version of an informal condition that defines the subtype $S_i$ can be made if the extended version is easier to formalize.

If several requirements are made for a same data type B, the several requirements can be combined together to make simpler requirements.

For the mapping $M_{E1}$, the mapping $M_{E1}(E)=\{act_1, \ldots, act_n\}$ can be extended for some start events E, in particular from action subtypes to the corresponding full action types. In one embodiment, an interpretation of multiple retention policies with start events is such that more start events can only extend an overall retention time.

After the above three steps, if informal conditions are still left to define subtypes $T_i$, the BDM needs to be extended by additional attributes that allow formalization of these informal conditions. Adding the additional attributes can simply be done through an attribute "is_S". If there is a BPM related to the BDM, the BPM must set the "is_S" attribute correctly when creating or manipulating data (e.g., subtype $T_i$). After adding the additional attributes, all data subtypes $S_i$ are defined by formal conditions, i.e., the triples $(B_i, f_i, c_i)$ in a result of $M_{D1}$ now all have $f_i$=true, where $B_i$ denotes a data type in the business model layer, $c_i$ denotes a constraint, $f_i$ denotes a Boolean value stating whether the constraint is formal.

In one embodiment, mapping data types of the BDM to data items (i.e., physical data such as a document; e.g., low-level objects) of the storage layer can already exist in an enterprise (in contrast to the mapping data types (i.e., high-level objects in a regulation or legal statement) of the regulation layer to data types (i.e., middle-level objects associated with handling a business) of the BDM). In particular, in a model-driven design (i.e., starting a design on a high layer and consistently implementing the design at lower layers), the BDM has been used to create a design of a database, a content management system (i.e., a system that keeps track of data that are less structured than typical database data, e.g., empty and filled forms or reports) and/or a planning of an actual storage of data (e.g., data items of the storage layer). If a BDM is available without a well-defined mapping to lower layers (i.e., there is no mapping from data types of the BDM to data items of the storage layer), such a mapping is made now and reused for other purposes than retention policies. In one embodiment, an enterprise data modeling and integration design tool (i.e., a tool for discovering potential relationships and identifying relationship (through mapping) between disparate data sources; e.g., IBM® Rational® Data Architect) can perform such a mapping (i.e., a mapping data types of the BDM to data items of the storage layer). In one embodiment, there is a manual intervention for the mapping (i.e., a mapping data types of the BDM to data items of the storage layer). This mapping (i.e., a mapping data types of the BDM to data items of the storage layer) is called as $M_{D2}$ (second data mapping). The mapping $M_{D2}$ do not introduce new subtypes (i.e., subtypes of data item), if the BDM and data model in the storage layer match each other (i.e., mapping a data type in the business model layer to a data item in a storage layer, mapping several data types in the business model layer to several data items in the storage layer). However, if $M_{D1}$ includes mapping to subtypes of data types of the BDM, corresponding $M_{D2}$ also includes mapping to subtypes of data items of the storage layer.

If start events (e.g., column 3 in the table 1) have non-default values, there are two cases on the business model layer:

For an action act of the BPM, there may be an existing mapping in an enterprise. This existing mapping maps an action, a set of several actions, or subset of actions of the BPM to actual executable process steps in the storage layer. If this mapping (i.e., mapping an action, a set of several actions, or subset of actions of the BPM to actual executable process steps in the storage layer) has not existed, this mapping is derived now.

A pair (pre, post) of a precondition of a start event and a postcondition of the start event on the BDM can be transformed into a similar pair (e.g., a pair of (a precondition of the start event, a postcondition of the start event)) by the mapping from the BDM to a data model on the storage layer.

For both cases, the mapping associated with the start events is called $M_{E2}$ (second event mapping).

Once mappings ($M_{D1}$, $M_{D2}$, $M_{E1}$, $M_{E2}$) are derived or given, a low-level policy on the storage layer is derived from the high-level policy (e.g., the table 1) by substituting high-level objects (e.g., data types of the retention policy, start events of the retention policy) with corresponding low-level objects (e.g., data items on the storage layer, executable process steps in the storage layer or a similar pair of (a precondition of the start event, a postcondition of the start event)) according to mappings $M_{D1}$, $M_{D2}$, $M_{E1}$, and $M_{E2}$. In one embodiment, when transforming a high-level policy (e.g., table 1) to a low-level policy, high-level objects are first substituted with middle-level objects (e.g., data types of the BDM, actions or a pair of (a precondition of the start event, a postcondition of the start event)) according to mappings $M_{D1}$ and $M_{E1}$. Then, the middle-level objects are substituted with low-level objects according to mappings $M_{D2}$ and $M_{E2}$.

In one embodiment, an actual data storage system (DSS) (i.e., a system for storing data at the storage layer; e.g., RAID 1) of an enterprise may not understand low-level policies that are derived from a policy transformation. Then, a syntax transformation (e.g., a high-level policy described as a table is transformed to a low-level policy described as a list or logic expression) is performed. In one embodiment, this syntax transformation is performed by a compiler. If a model-driven design is used for the BDM and the storage layer, a policy transformation may become a part of an overall data deployment tool (i.e., a tool for delivering data directly and cost-effectively to users; e.g., IBM® Tivoli® Storage Manager).

In one embodiment, a DSS with data labeling (i.e., allowing storage of individual objects or data types with policies as specific metadata) is used. In another embodiment, a DSS based on storage sets (i.e., grouping data into sets that are treated in a same way) is used.

In DSS with data labeling, the data storage system (DSS) allows storage of individual data objects or data types with policies as specific metadata. In one embodiment, the DSS with data labeling knows all retention attributes (e.g., column headings in the table 1). If the DSS with data labeling does not know all retention attributes, there should be an additional management system (i.e., a supplemental system for associating low-level objects (e.g., storage devices) with retention attributes).

Then a policy transformation from the business model layer to the storage layer is simply to use retention attribute values from each row of a retention policy matrix (e.g., table 1) as metadata for the data type in the first column of this row, or for individual data objects of these data types. This policy transformation may include simple syntax changes of the attributes. In one embodiment, a DSS with data labeling can notice on its own that data with a retention attribute cannot actually be updated. Hence each update produces a new version of the data, with appropriate metadata to keep the versions linked. A default start event such as "last update" of the business model layer corresponds to a data creation event of the DSS, which is indeed the default start event in the DSS. In one embodiment, the DSS can verify if data types exist with an expired retention attribute and then correctly handles these data types with the expired retention attribute, e.g., by ignoring the expired retention attribute.

If the policies are labels on each individual data object (e.g., data item on the storage layer), whether results of $M_{D2}$ were full data types or subtypes does not need to be defined, because each data object is handled on its own.

If there is a BPM, and the BPM is realized by an explicit business process execution engine (i.e., an entity that enables business execution process by linking multiple services both inside and between enterprises; i.e., a generic engine that abstracts a business execution logic and encapsulates a business functional logic in a business model layer; e.g., IBM® WebSphere® Process Server or IBM® FileNet® Business Process Manager or ActiveGlobe BizEngine/BPEL from NEC®; herein after "BPEE"), then the data labeling can be almost unchanged between the BPM related to the BDM and the BPEE related to the DSS. If the BPM allows modeling non-default start events for retention times as explicit events, then the translation of these start events to the BPEE is also essentially without changes. If start events are only characterized by attributes on actions in the BPM, then the translation to the BPEE has to turn the start events into explicit events that are sent to the DSS.

If there is no BPM, then the start events of the regulation layer were mapped to condition pairs (pre, post) on the BDM. If there is a BPM, but no BPEE, such a mapping (e.g., a pair (pre, post)) is made. Then these condition pairs have to be transformed into a triggering mechanism on the DSS, i.e., a mechanism in the DSS where the DSS checks certain conditions after each update and starts certain actions if the conditions are fulfilled. If the DSS has no trigger mechanisms, then it is better not to try to implement retention with such start events without having a BPEE, i.e., a BPEE should be available for the start events using DSS, so that these start events cannot be forgotten.

A DSS based on storage sets does not have data labeling capabilities (i.e., allowing storage of individual objects or data types with policies as specific metadata) for retention attributes. The DSS based on storage sets sorts data into storage sets (StS) with similar policy attributes, because that makes the actual storage management more efficient. Here "storage sets" mean grouping data into sets that are treated in a same way.

Each retention attribute (RA) from policies of the business model layer is analyzed for its occurrence in the DSS based on storage sets. There are three cases:
1. RA is not known in the DSS at all.
2. RA is an existing attribute of storage sets in the DSS (where, a name of RA may be different in the DSS, e.g., "retention time" vs. "retention period" or "RETVER").
3. RA is a recognized attribute of individual data types or items in the DSS.

Virtual storage sets (i.e., logical storage sets that virtualizes physical storage sets; hereinafter "VStS") are used for all occurring combinations of retention attribute values of Case 1 (i.e., RA is not known in the DSS at all) and Case 2 (i.e., RA is an existing attribute of storage sets in the DSS). If it seems that unreasonably many VStSs are used, mapping a retention policy to a simpler retention policy can reduce the number of VStS.

In one embodiment, a mapping $M_{D3}$ (third data mapping) is defined by mapping each data item or subtype of the BDM to an appropriate VStS in the storage layer, i.e., to a VStS with correct retention attributes of Cases 1 and 2. In one embodiment, some data items may be mapped to more than one VStS.

If a VStS is used only by retention attributes of Case 2, the VStS can simply be implemented as a physical storage sets (StS) with the retention attributes. If a VStS also has retention attributes of Case 1, an additional management system (AMS) is implemented around the DSS based on storage sets. For instance, if a VStS called "DoubleStorage" includes a retention attribute (RA) value number_of_places=2, and this RA is the only retention attribute of Case 1 in this VStS, then the additional management system (AMS) must provide two StSs for this retention attribute. Retention attributes of Case 3 (RA is a recognized attribute of individual data types or items in the DSS) remain with corresponding data items on the storage layer.

If a BPM and a BPEE are given, the storage operations of the BPEE must be directed to a correct virtual storage set (VStS):
  If there is an AMS, it may provide these functions (e.g., storage operations) alone, i.e., the AMS may offer the interface of a storage system with data labeling and place data virtually in the correct VStS and actually into the corresponding StS. For instance, the AMS can recognize that data belong to the VStS "DoubleStorage" and places the data in the two StSs that the AMS defined.
  The AMS may offer an interface for a physical storage set: the AMS obtains data with a VStS indicated, and performs translations to place the data correctly in corresponding StS. In one embodiment, storage operations of the BPEE have to be augmented to indicate the correct VStS. When a subtype S of a data type B is defined by a condition c, the condition c can be assumed as a formal. In one embodiment, the condition c can be defined as a real-time condition for data placement. For instance, a method for storing a check may become IF currency≠CHF THEN store in VStS Foreign_payment_data
  ELSE store in VStS Swiss_payment_data,
  assuming that these VStSs are defined with appropriate attributes.

If no AMS was needed or an AMS was designed to provide only the minimum additional functionality for VStSs, then the storage operations of the BPEE must immediately indicate correct StSs, i.e., the mapping $M_{D3}$ is applied to these storage operations within the BPEE.

In one embodiment, the AMS is considered as a virtualization appliance (i.e., an appliance for hiding physical characteristics of physical resources from users; e.g., a single physical resource appears to function as multiple virtual resources; e.g., multiple physical resources appear as a single virtual resource). An entire operation (e.g., the storing data in two StSs) is applied within the storage operations of the BPEE.

If there is a BPEE, and if the DSS has a notion of start events that extend retention times, start events are handled very similar to data placement (i.e., placing data virtually in a VStS and placing data actually in a StS):
  If there is an AMS, the AMS may offer an interface of a physical storage set (StS) with data labeling.
  An AMS offers an interface of VStSs. Then the BPEE sends the start events to the VStSs and the data item (e.g., low-level objects) to where the data item belongs (i.e., the AMS transfers the start events to corresponding StSs).
  If there is no AMS, then there is no interface for start events. The BPEE directly sends the start events to corresponding StSs.

In one embodiment, the DSS does not have a notion of start events. Then, there are two possibilities:
  a. Data (e.g., data item on the storage layer) are stored forever (i.e., retention time of the data is limitless).
  b. For each start event, a new copy of data (e.g., data item on the storage layer) is made in a physical storage set (StS) that stores the data correctly according to its other retention attributes.

If there is no BPEE and start events are mapped to pre-/postcondition pairs (e.g., (pre, post)) in the mapping $M_{E2}$, the pre-/postcondition pairs are implemented as real triggers on the storage layer. If the DSS has no trigger mechanisms (i.e., a mechanism in the DSS where the DSS checks certain conditions after each update and starts certain actions if the conditions are fulfilled), then it is better not to implement retention with such start events without a BPEE, i.e., a BPEE should be available for actions that are considered as start events in the retention policies.

In one embodiment, the present invention is implemented or realized as hardware through a computer, which includes a general purpose processor, a memory device, a display device, a disk device, a CD-ROM drive, etc.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A computer-implemented method for transforming a high-level policy associated with a business layer to a low-level policy associated with an IT (Information Technology) layer comprising:
    identifying high-level objects in the high-level policy;
    identifying low-level objects in the IT layer;
    automatically discovering a data dependency between the high-level objects and the low-level objects;
    mapping the high-level objects to related low-level objects in the IT layer, the mapping including a first mapping and a second mapping, the first mapping that maps each high-level object to a set of {u, e, t, f}, where the u indicates a Uniform Resource Locator (URL) associated with the each high-level object, the e indicates a middleware between the each high-level object and the low-level objects, the middleware e transforming the URL into a database query, the f indicates a file that the database query seeks, the t indicates a table that represents a content of the file, the second mapping that maps the middleware e to a triple (IPe, pe, ine), where the IPe indicates an IP address of the middleware e, the pe indicates a port number that the middleware e uses, the ine indicates an indicator of the middleware e; and
    mapping the high-level policy to the low-level policy by applying the discovered data dependency and by substituting the high-level objects with the related low-level objects, the low-level policy being {(IPu, pu, inu), (IPe, pe, ine), (IPt, pt, ine), (IPf, pf, inf)},
    wherein a processor coupled to a memory device performs: the identifying the high-level objects, the identifying the low-level objects, the automatically discovering the data dependency, the mapping the high-level objects, and the mapping the high-level policy.

2. The computer-implemented method according to claim 1, further comprising:
    performing a syntax transformation between the high-level policy and the low-level policy.

3. The computer-implemented method according to claim 1, wherein the data dependency is discovered by an automated discovery tool.

4. The computer-implemented method according to claim 1, wherein the identifying high-level objects, the identifying low-level objects, the discovering data dependency, the mapping the high-level objects to related low-level objects, and the mapping the high-level policy to the low-level policy are fully automated.

5. The computer-implemented method according to claim 1, wherein the high-level policy is one or more of: an access control policy, a privacy policy, an auditing policy, a firewall policy, a security policy, a monitoring policy, a traffic shaping policy, a data retention and storage policy, a workload distribution policy, a device configuration policy, and a business policy.

6. The computer-implemented method according to claim 1, wherein at the step of mapping the high-level policy to the low-level policy, the high-level policy is mapped to a subset of a low-level policy that the IT layer supports.

7. A computer-implemented system for transforming a high-level policy associated with a business layer to a low-level policy associated with an IT (Information Technology) layer comprising:
    a processor;
    a memory device coupled to the processor,
    wherein the processor is configured to perform:
        identifying high-level objects in the high-level policy;
        identifying low-level objects in the IT layer;
        automatically discovering a data dependency between the high-level objects and the low-level objects;
        mapping the high-level objects to related low-level objects in the IT layer, the mapping including a first mapping and a second mapping, the first mapping that maps each high-level object to a set of {u, e, t, f}, where the u indicates a Uniform Resource Locator (URL) associated with the each high-level object, the e indicates a middleware between the each high-level object and the low-level objects, the middleware e transforming the URL into a database query, the f indicates a file that the database query seeks, the t indicates a table that represents a content of the file, the second mapping that maps the middleware e to a triple (IPe, pe, ine), where the IPe indicates an IP address of the middleware e, the pe indicates a port number that the middleware e uses, the ine indicates an indicator of the middleware e; and mapping the high-level policy to the low-level policy by applying the discovered data dependency and by substituting the high-level objects with the related low-level objects, the low-level policy being {(IPu, pu, inu), (IPe, pe, ine), (IPt, pt, int), (IPf, pf, inf)}.

8. The computer-implemented system according to claim 7, wherein the processor is further configured to perform a syntax transformation between the high-level policy and the low-level policy.

9. The computer-implemented system according to claim 7, wherein the data dependency is discovered by an automated discovery tool.

10. The computer-implemented system according to claim 7, wherein the identifying high-level objects, the identifying low-level objects, the discovering data dependency, the mapping the high-level objects to related low-level objects, and the mapping the high-level policy to the low-level policy are fully automated.

11. The computer-implemented system according to claim 7, wherein the high-level policy is one or more of: an access control policy, a privacy policy, an auditing policy, a firewall policy, a security policy, a monitoring policy, a traffic shaping policy, a data retention and storage policy, a workload distribution policy, a device configuration policy, and a business policy.

12. The computer-implemented system according to claim 7, wherein the mapping the high-level policy to the low-level policy comprises mapping the high-level policy to a subset of a low-level policy that the IT layer supports.

13. A computer program product for transforming a high-level policy associated with a business layer to a low-level policy associated with an IT (Information Technology) layer, the computer program product comprising a non-transitory storage medium readable by a processing circuit and storing instructions run by the processing circuit for performing a method, said method steps comprising:

identifying high-level objects in the high-level policy;

identifying low-level objects in the IT layer;

automatically discovering a data dependency between the high-level objects and the low-level objects;

mapping the high-level objects to related low-level objects in the IT layer, the mapping including a first mapping and a second mapping, the first mapping that maps each high-level object to a set of {u, e, f}, where the u indicates a Uniform Resource Locator (URL) associated with the each high-level object, the e indicates a middleware between the each high-level object and the low-level objects, the middleware e transforming the URL into a database query, the f indicates a file that the database query seeks, the t indicates a table that represents a content of the file, the second mapping that maps the middleware e to a triple (IPe, pe, ine), where the IPe indicates an IP address of the middleware e, the pe indicates a port number that the middleware e uses, the ine indicates an indicator of the middleware e; and mapping the high-level policy to the low-level policy by applying the discovered data dependency and by substituting the high-level objects with the related low-level objects, the low-level policy being {(IPu, pu, inu), (IPe, pe, ine), (IPt, pt, int), (IPf, pf, inf)}.

14. The computer program product according to claim 13, wherein the method further comprises:

performing a syntax transformation between the high-level policy and the low-level policy.

* * * * *